United States Patent [19]
Dieffenderfer et al.

[11] Patent Number: 5,910,930
[45] Date of Patent: Jun. 8, 1999

[54] DYNAMIC CONTROL OF POWER MANAGEMENT CIRCUITRY

[75] Inventors: James N. Dieffenderfer; George Filip Diniz, both of Apex; Thomas Andrew Sartorius, Raleigh, all of N.C.

[73] Assignee: International Business Machines Corporation, Armonk, N.Y.

[21] Appl. No.: 08/868,314

[22] Filed: Jun. 3, 1997

[51] Int. Cl.[6] ................................. G04F 5/00; G06F 1/00
[52] U.S. Cl. ......................... 368/156; 364/707; 395/750
[58] Field of Search .............................. 368/10, 155, 156, 368/157; 364/707; 395/550, 750

[56] References Cited

U.S. PATENT DOCUMENTS

| | | | |
|---|---|---|---|
| 5,392,437 | 2/1995 | Matter et al. | 395/750 |
| 5,502,689 | 3/1996 | Peterson et al. | 368/156 |
| 5,511,203 | 4/1996 | Wiser et al. | 395/570 |
| 5,630,143 | 5/1997 | Maher et al. | 395/750 |
| 5,634,131 | 5/1997 | Matter et al. | 395/570 |
| 5,664,205 | 9/1997 | O'Brien et al. | 395/750.04 |
| 5,715,467 | 2/1998 | Jirgal | 395/750.01 |

*Primary Examiner*—Vit Miska
*Attorney, Agent, or Firm*—Steven B. Phillips

[57] ABSTRACT

Method and apparatus for dynamic control of power management circuitry in a microprocessor. A clock and power management subsystem within the microprocessor contains clock generation and control logic and a powered-down mode register. The register is controlled by register control logic in the microprocessor and determines the powered-down mode of the various hardware units that make up the microprocessor. The clock generation and control logic also receives a powered-down mode enable signal from each of the hardware units. The hardware unit receive a re-power-up signal which, when activated and deactivated, can cause the hardware units to de-activate and activate, respectively, the powered-down mode enable signal. This combination of features allows continuous, repetitive, dynamic, hardware-controlled entry into exit from power saving modes without software intervention, thereby allowing the power saving modes to be used more often and more effectively for shorter periods of time than would be possible with software controlled power management.

7 Claims, 4 Drawing Sheets

DYNAMIC CONTROL OF POWER MANAGEMENT CIRCUITRY

BACKGROUND

1. Field of the Invention

This invention is related to power management in a microprocessor. More specifically, this invention has to do with mechanisms for managing the clocking within a microprocessor, so that clocks in the microprocessor can be altered over time. In the type of clocking system involved, a clock source drives clock generator logic which derives multiple clock signals and feeds the signals to registers in various hardware units within the microprocessor. Clock management allows the power consumption of the microprocessor to be reduced when normal clocking of some units within the microprocessor is not needed.

2. Description of the Problem

Many microprocessor-based systems are designed to minimize the amount of power consumed by the system. This power minimization is especially important for battery operated systems. Techniques are needed both in the design of the system itself and in the design of the integrated circuits used in the system. For example, a microprocessor or embedded controller in the system may need to use sophisticated mechanisms for controlling the power consumed by the microprocessor. These mechanisms often employ control registers that are manipulated by software which is running in the system. Writing a particular value to such a register may cause the power management logic to alter the clocking signals to some hardware units within the processor, shutting off clock signals to some or even all circuitry within some units to reduce power consumed during operations where not all units in the processor are needed. In some cases, the frequency of specific clocking signals may be reduced as opposed to having the clock signal shut off.

Clock disabling mechanisms used to disable clock signals in a microprocessor fit roughly into six categories. The mechanisms in some categories have a more severe effect on the operation of the microprocessor than the mechanisms in others. If the clock disabling is more severe, the clock signal is disabled closer to its source and farther from a register where the signal is used to latch information. To use a water supply analogy, the most severe mechanism would be to stop the flow of water from a dam into the water company. A less severe would be to turn off the tap at an individual faucet in a home. The six categories of clock disabling power management can be described from least severe to most severe as follows:

1. Supply normal clock signals.
2. Reduce clocking frequency but continue to supply clock signals.
3. Disable clock signal at each register where it is used, with the clock signal itself being switched and delivered to each hardware unit register.
4. Gate off clock signal after the clocks are generated, but before being delivered to each register.
5. Disable clock generator but leave clock source active.
6. Disable clock source.

The more severe modes of clock disabled power management result in greater reduction in power consumption, but have a greater impact on overall performance because they require more time to exit and resume normal clocking.

The entering into and waking up from clock disabling power management modes in currently handled by a mixture of software and hardware control. Software controls the entry into a clock disabling mode and hardware controls the waking up from a clock disabling mode. Software first ensures that a microprocessor hardware unit that is to have the clocks altered is idle. Shutting off clocks effectively powers down the unit in question; therefore, clock disabling modes are called powered-down modes. The unit must be ready to be powered-down. That is, the unit must not be in the middle of performing some operation. Once the software has confirmed the unit is ready to be powered-down, the software manipulates a clocking control register to affect the clock signals sent to the appropriate hardware unit. When it is time to wake up the hardware unit, an event in the system causes an interrupt, which automatically disables the powered-down mode and restores the clocks to normal clocking. The affected unit then resumes normal operation.

The problem with the above approach is that the software management of the entry of a powered-down mode requires specialized, hardware-specific software and it may take many cycles to complete the required actions. Therefore, powered-down modes will only be used under drastic circumstances where a microprocessor unit will be in a powered-down mode for a relatively long period of time. However, it is common for there to be frequent, short periods when a microprocessor hardware unit is either not needed, or could have its performance reduced by lowering the frequency of one or more of its clocks. What is needed is a hardware based mechanism that allows a microprocessor to handle power management in an efficient, dynamic fashion, so that power can be saved at all opportunities, without requiring software intervention.

SUMMARY

The present invention meets the above need by providing dynamic control of power management circuitry using a hardware-based power management system. The invention is used in a microprocessor which is made up of hardware units. Hardware units are the building blocks of the processor. Examples of some hardware units are a DMA controller, a floating point unit, a memory management unit and an integer unit. According to the invention, each hardware unit has a clock and control signal input and a powered-down mode enable output and a re-power-up input. The microprocessor also includes a clock source input, register control logic, and a clock and power management subsystem. The clock and power management subsystem manages both the entry into and the exit from a powered-down mode. The register control logic sets a register in the clock and power management subsystem to select the powered-down mode and hardware units notify the clock and power management subsystem that they are ready to power down through the powered-down mode enable signal.

The clock and power management subsystem of the invention includes a register which sets the powered-down mode, called the powered-down mode register. The powered-down mode register is connected to the register control logic in the processor through register inputs. The register is also connected to clock generation and control logic and supplies powered-down mode information to the clock generation and control logic. The clock generation and control logic generates the clock and control signals for all the hardware units from the clock source, and also determines whether a hardware unit is ready to be powered down using the powered-down mode enable signal. The clock and control signals are output to all the hardware units through clock and control signal outputs. The powered-down mode register can simply set powered-down modes in which clocks are powered-down at certain stages, or it can manipulate the clock generation and control logic to change the frequency of some of the clocks.

The clock and power management subsystem operates by first determining if a powered-down mode enable signal for a hardware unit is active. If so, the subsystem alters clock signals according to the selected powered-down mode. The subsystem then monitors the powered-down mode enable input to ensure it remains active, and monitors the powered-down mode register to determine if the selected powered-down mode is changed. The subsystem continues in a powered-down mode unless the powered-down mode enable becomes inactive, in which case it resumes supplying normal clock signals. It will alter the clock signals if the selected powered-down mode changes.

The hardware unit operates by preparing itself to be powered down and checking to make sure a re-power-up signal is not active. If it is ready to be powered down and the re-power-up signal is not active, it activates its powered-down mode enable signal. The clock and power management subsystem then alters the hardware unit's clocks and the hardware unit enters a powered-down mode. If the re-power-up signal becomes active, indicating the unit is needed to perform some operation, it de-activates the powered-down mode enable, and the clock and power management subsystem restores normal clocks so the hardware unit can exit the selected powered-down mode and return to normal operation. The unit can then re-enter the same powered-down mode again by simply re-asserting the powered-down mode enable signal whenever it completes its current operation and becomes ready to be powered-down again, and the re-power-up signal is no longer active. Therefore, software intervention is not needed.

The invention provides dynamic, hardware-based power management for a microprocessor. This dynamic power management allows more frequent use of powered-down modes for more efficient operation and less power consumption, since software intervention is not needed for a hardware unit to enter, exit, and re-enter, continuously, a powered-down mode once the mode has been selected.

DETAILED DESCRIPTION OF THE PREFERRED EMBODIMENT

Figure 1:
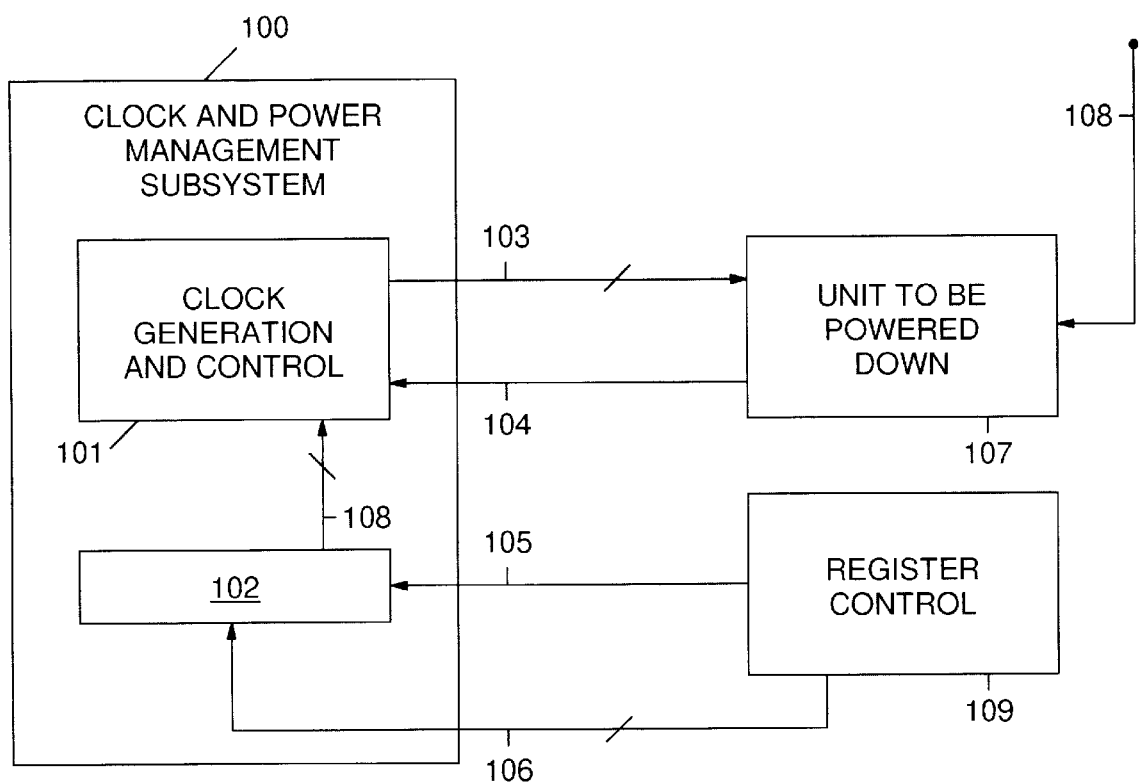
FIG. 1 shows the clock and power management subsystem of the present invention connected to a hardware unit and the register control logic within a microprocessor.

In the preferred embodiment, the invention is implemented by a clock and power management subsystem within a microprocessor, often a special purpose microprocessor such as an embedded controller. FIG. 1 shows the clock and power management subsystem 100 connected to register control logic 109 and a microprocessor hardware unit 107 which is subject to power management. The hardware unit 107 can be any hardware building block of the processor, such as a DMA controller or a floating point execution unit.

Within the subsystem 100 is a powered-down mode register 102. The register is connected to the register control logic 109 by register inputs for data 106 and write enable 105. The register supplies mode values to clock generation and control logic 101 via signal line 108. The clock generation and control logic supplies a clock and control signal output 103 to a hardware unit and receives a powered-down mode enable signal via powered-down mode enable input 104. The powered-down mode register 102's control bits select a powered-down mode by manipulating the clock frequency and by gating clock signals supplied to the hardware unit 107. In addition, the hardware unit 107 is provided with a re-power-up control signal 108 which notifies the hardware unit when an operation needs to be performed, meaning the hardware unit must resume normal operation.

The source of the re-power-up signal is unique for each hardware unit which is participating in the dynamic power management function. The re-power-up control signal is a combination of conditions which indicate to the powered-down hardware unit that the unit must resume operation. In the preferred embodiment, the re-power-up control signal is a combination of one or more input signals, such as request and/or enable signals, from other logic inside or outside the chip containing the power management feature, along with conditional logic within the hardware unit itself. An interrupt request is a typical re-power-up signal, because it means the processor must "wake-up" to service the interrupt. Upon recognizing the re-power-up signal, the hardware unit drops its powered-down mode enable so that the clock and power management subsystem will resume providing normal clocks and the hardware unit can resume normal operation.

In the preferred embodiment, the register control logic is simply decode logic which recognizes an instruction opcode whose function is to write the powered-down mode register. The register control logic recognizes the opcode and activates the write enable signal to the register. The register control logic also supplies the input data to the powered-down mode register. The data can be supplied from an immediate field of the instruction which writes the register, or from a general purpose register specified by the instruction, or from any other register. clock generation and control logic in the preferred embodiment consists of a clock generator, global gating circuits and a 3-to-6 decoder, which accepts a 3-bit value coming from the powered-down mode register and decodes it to provide six "mode select" signals. The clock generator can be either a phase-locked loop (PLL) circuit or a delay-locked loop (DLL) circuit. It obtains a clock source signal from an external terminal connected to a crystal or oscillator. The clock generator is connected to the global gating circuits, which in turn are connected to local re-drive circuits at the registers in the hardware units which participate in the dynamic power management.

The 3-to-6 decoder operates to select one of six powered-down modes that correspond to the six levels of severity of clock disabling power management discussed in the BACKGROUND section of this application, and reproduced here in a manner which corresponds to the preferred embodiment of the invention.

1. Supply a normal clock signal to each register in a hardware unit where the clock signal is used.
2. Reduce the frequency of the clock signal supplied to a hardware unit.
3. Disable the clock signal at each register in the hardware unit where it is used, with the clock signal itself being enabled and delivered to each hardware unit register.
4. Gate off the clock signal at the global gating circuits, after the clocks are generated, but before being delivered to each hardware unit.

5. Disable the PLL or DLL clock generator but leave clock source active.

6. Disable the clock source.

For the least severe mode (normal clock) one select line chooses the normal frequency clock to send to the hardware unit. For mode 2, the mode select signal chooses a reduced frequency output of the clock generator to send to the hardware unit. For mode 3, one select line is actually connected to the local re-drive circuit in the hardware unit as one of the clock control signals. This line can and-off the local clock re-drive circuit independently at some or all of the hardware unit's registers. For mode 4, the mode select signal enters the global gating circuits and can and-off the output of the PLL or DLL and prevent the clock signal from toggling to any of the registers in the hardware unit to which this leg of the PLL or DLL output is being supplied. For mode 5, the select line is connected to the PLL or DLL and prevents it from performing its function, even though the clock source is still toggling. Finally, the select line for the most severe mode, number 6 above, can and-off the clock source input to the clock generator.

Figure 2:
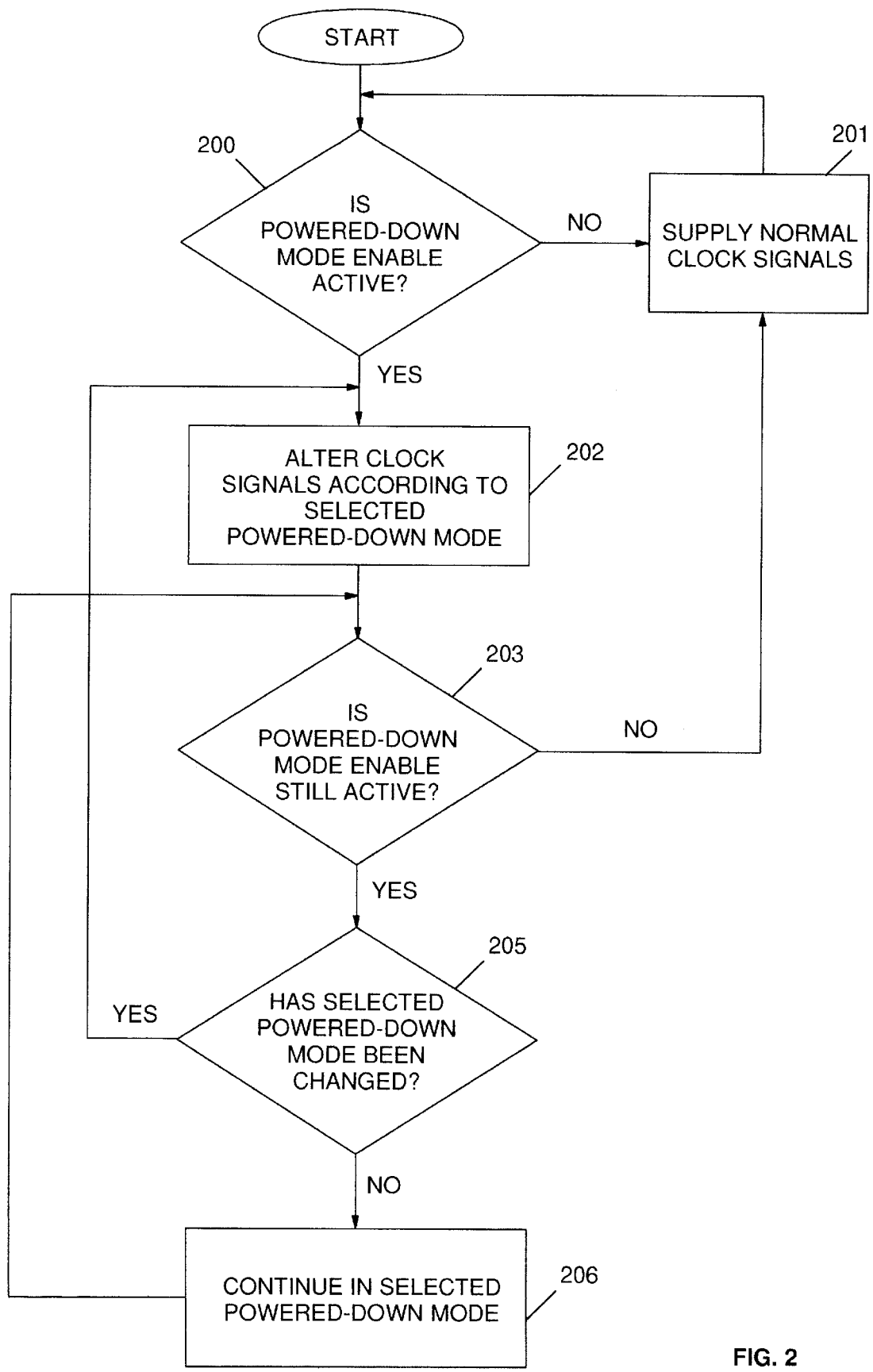
FIG. 2 shows the method by which the clock and power management subsystem operates.

FIG. 2 illustrates the method of operation of the clock and power management subsystem according to the present invention. After initialization, the subsystem checks to see if the powered-down mode enable line is active at 200. If not, the subsystem continues to supply normal clock signals at 201. If so, the clock signals are altered at 202 according to the powered-down mode selected by the powered-down mode register. At 203 and 205, the subsystem monitors to see if the powered-down mode enable line goes inactive, or if the selected powered-down mode changes, respectively. If the powered-down mode enable line becomes inactive at 203, normal clocking is restored at 201. If the powered-down mode changes at 205, the clocks are altered again at 202 and the process continues. If the powered-down mode enable stays active and there are no changes in the selected powered-down mode, the hardware unit being controlled continues in the selected powered-down mode at 206.

Figure 3:
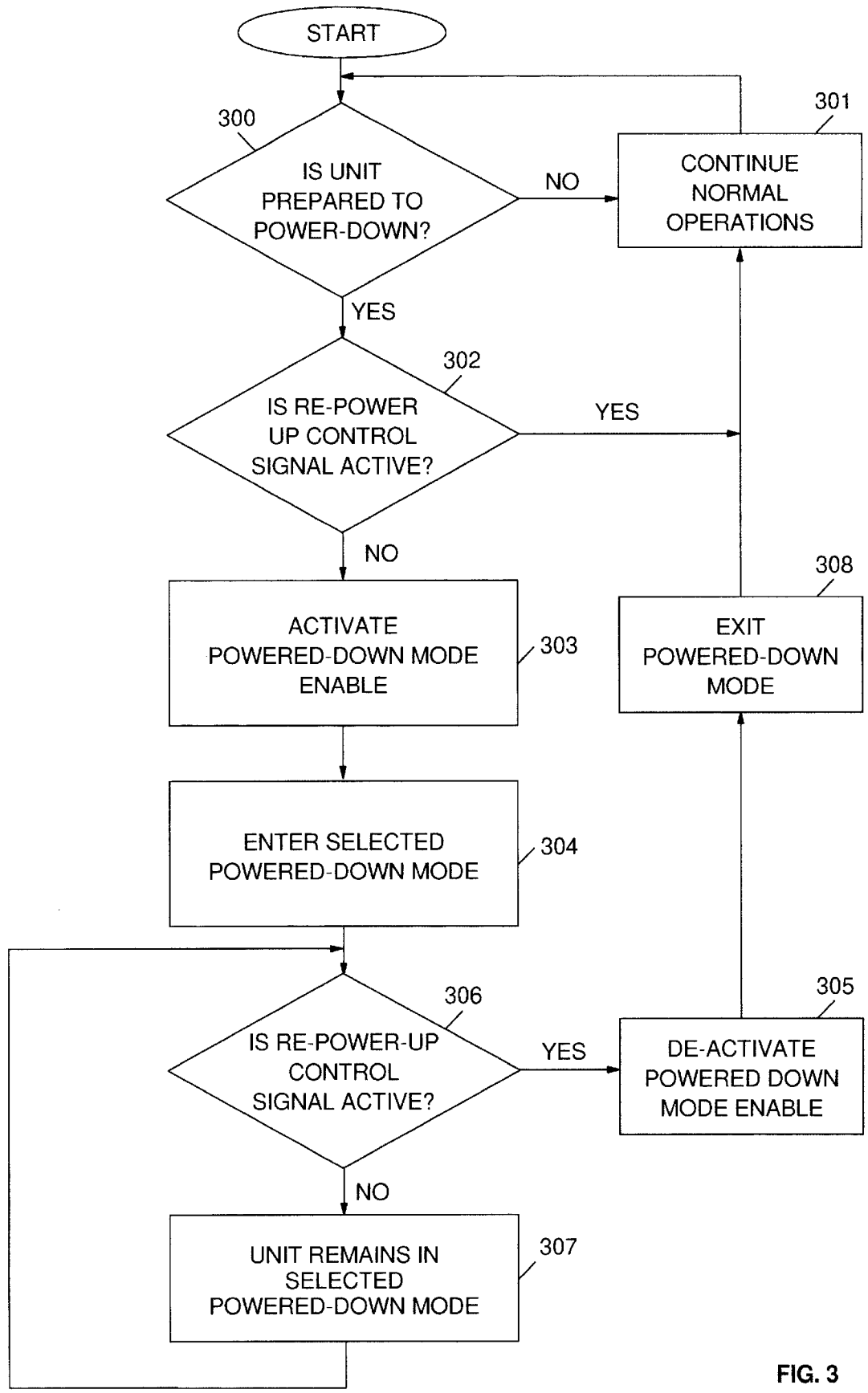
FIG. 3 shows the method by which a hardware unit within a microprocessor operates when under dynamic power management.

Turning to FIG. 3, the method of operation of a microprocessor hardware unit being controlled by the clock and power management subsystem of the present invention is illustrated. At 300 the hardware unit determines if it can be powered down (e. g. because it is not currently performing an operation). If not, normal operation continues at 301. If so, the unit checks to see if the re-power-up signal is active at 302. If so, normal operation continues at 301. If not, the unit activates the powered-down mode enable at 303 and enters the selected powered-down mode under the control of the clock and power management subsystem at 304. At 306, the hardware unit monitors the re-power-up control signal. If the re-power-up signal becomes active, the unit deactivates the powered-down mode enable at 305, exits the powered-down mode at 308, and resumes normal operation at 301. If the re-power-up signal does not become active, the unit remains in the selected powered-down mode, as shown at 307.

To illustrate an application of this invention, consider a microprocessor which contains an integrated DMA controller. Typically, while the microprocessor itself may be executing instructions and performing some task virtually all of the time, the DMA controller may be only sporadically requested by an external device to perform some data transfer between memory and the device. Rather than supplying a clock signal at all times to the entire chip, including the DMA controller, it would be desirable to only supply a continuous clock to certain parts of the microprocessor, and to disable the clocking signal to the DMA controller except for those periods of time when the DMA controller is actually being requested to transfer data.

Using this invention, software would select one of the powered-down modes for the DMA controller portion of the chip using the powered-down mode register, and the DMA controller itself would activate the powered-down mode enable signal to the clock and power management subsystem, indicating when there were no active requests from external devices to transfer data. As long as there were no active requests, the clock and power management subsystem would be enabled to disable the clock to the DMA controller. Once a DMA request was activated by an external device, this request would act as the re-power-up signal for the DMA controller and would cause the DMA controller to deactivate the powered-down mode enable signal it was sending to the clock and power management subsystem, indicating that the DMA controller should no longer be powered-down.

Upon deactivation of this powered-down mode enable signal from the DMA controller, the clock generation and control circuitry in the clock and power management subsystem would resume supplying a clock signal to the DMA controller, enabling it to perform the requested transfer. The powered-down mode itself, however, would remain selected and awaiting re-enablement by the hardware signal. In this manner, once the DMA transfer was performed and the DMA request signal was de-activated, causing the re-power-up signal to de-activate, the DMA controller hardware would automatically re-activate the powered-down mode enable signal to the power management logic, which would then automatically power-down the DMA controller again. No software intervention would be required, once the initial selection of the powered-down mode has been made.

If the DMA controller were controlling DMA transfers for multiple devices, an "or" of the request signals from all the devices would constitute the re-power-up signal. Alternatively, in a slightly more complex system, the DMA controller might "and" the request with an enable bit to determine whether the requesting device is actually enabled to be serviced, and then only acknowledge a re-power-up signal as a DMA request coming from an "enabled" device.

Another example of a microprocessor hardware unit that lends itself to power management using the invention is a floating point execution unit. Most microprocessor designs include an enable bit that controls whether the floating point unit will be allowed to execute any floating point opcodes that come along in the instruction stream. For example, in PowerPC™ microprocessors manufactured by the assignee of this application, this bit is called the Floating Point Available or FPA bit in the Machine State Register, or MSR. Obviously, as long as the FPA bit is off, there is no need to be clocking the floating point execution unit because the unit will not be allowed to execute any instructions. Therefore, the FPA bit inverted can serve as the powered-down mode enable bit for the floating point unit, while a positive version of the FPA bit can serve as the re-power-up signal.

Figure 4:
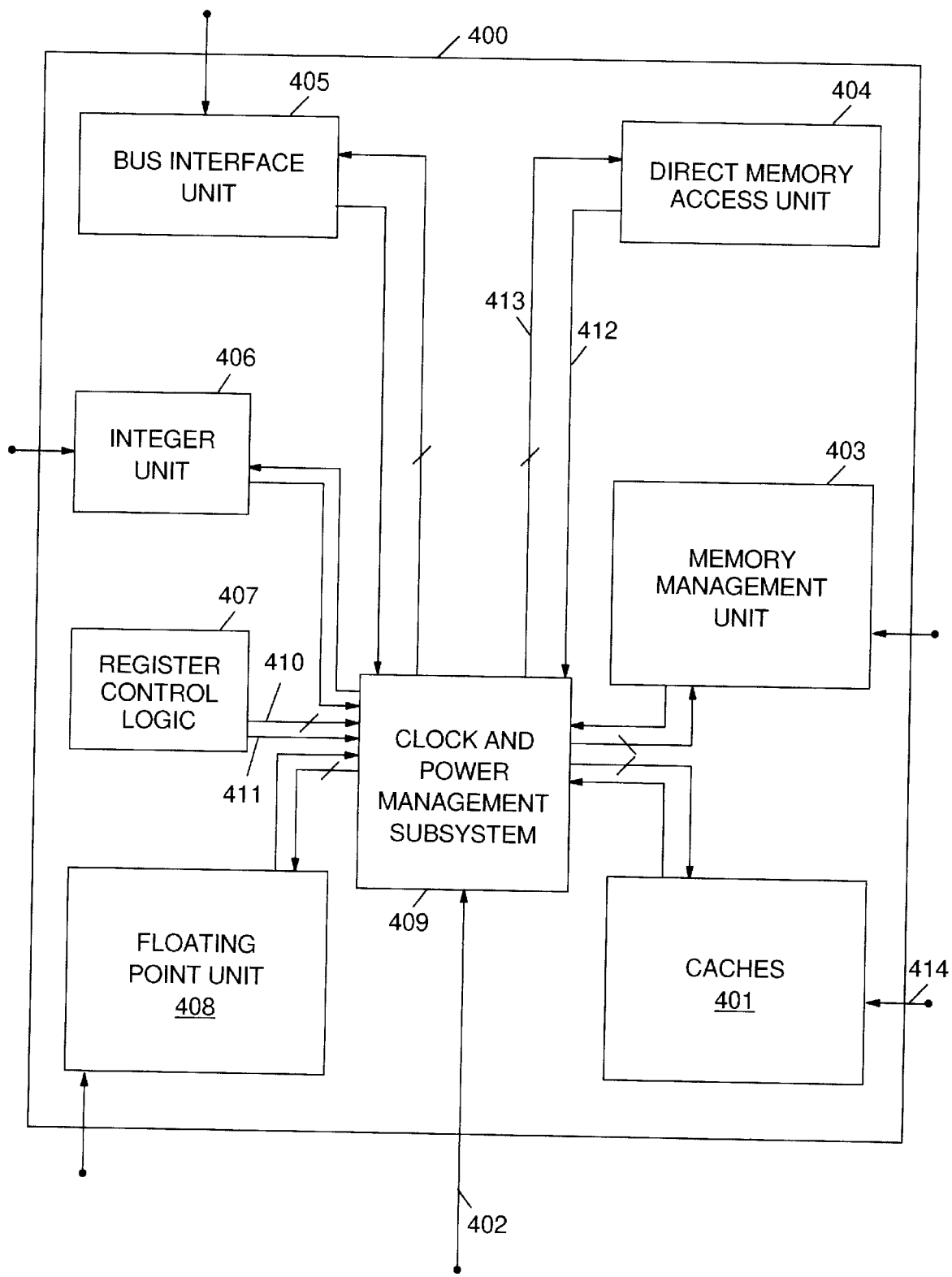
FIG. 4 shows an example of an entire microprocessor on which the dynamic power management of the present invention is employed.

FIG. 4 shows an example of a microprocessor in which the invention is employed. Microprocessor 400 has the following hardware units: bus interface unit 405, direct memory access (DMA) unit 404, memory management unit 403, caches 401, floating point unit 408 and integer unit 406. The microprocessor also contains register control logic 407. The clock and power management subsystem 409 has a clock source input 402 which is connected to a clock source such as an oscillator or crystal unit. Each hardware unit has a clock and control signal input 413, a powered-down mode enable output 412 and a re-power-up input signal 414. The powered-down mode register (not shown) inside the clock and power management subsystem 409 is set by the register control logic 407 through the register enable line 411 and the register data line 410.

We have described a preferred embodiment of our invention for dynamic control of power management in a microprocessor. The invention eliminates the need for software intervention to manage the entrance into power saving modes by various hardware units in a microprocessor, once the initial selection of a powered-down mode has been made. While we have described a preferred embodiment, those of ordinary skill in the art will readily appreciate that other embodiments are possible.

We claim:

1. A clock and power management subsystem for controlling clock signals supplied to one or more data processing subsystems in response to a predetermined programmable control signal and an activity signal supplied by each of the one or more data processing subsystems comprising:

powered-down mode enable logic for providing a power-down control signal for defining the clock signals required by the at least one data processing subsystem when in an inactive state;

clock generation and control logic having an output for providing normal or modified clock signals to the at least one data processing subsystem, a first input for receiving the power-down control signal supplied by the powered-down mode enable logic and a second input for receiving a power-down mode activity signal supplied by the at least one data processing subsystem; and, in response to the receipt of a power-down mode activity signal received from the at least one data processing subsystem providing clock signals specified by the input received from the powered-down mode enable logic in place of normal clock signals.

2. The clock and power management subsystem of claim 1 in which the powered-down mode enable logic includes a program controlled register which stores the power-down control signal and has its output connected to the first input of the clock generation and control logic.

3. The clock and power management system of either claim 1 or 2 further comprising:

clock modification logic for monitoring the input received from the powered-down mode enable logic and the power-down activity signal supplied by the at least one microprocessor subsystem and modifying the clock signals supplied to the microprocessor subsystem in accordance with the input received from the powered-down mode enable logic only when the power-down mode activity signal is in a state indicating inactivity.

4. In a microprocessor, a subsystem comprising:

one or more microprocessor hardware units each having an input for receiving clock signals and an output for providing a power-down mode signal when the unit is inactive;

clock generation and control logic connected to the clock signal input of the microprocessor hardware unit for supplying normal or modified clock signals to the unit; and, clock modification logic connected to the clock generation and control logic for supplying power-down control signals for modifying the normal clock signals supplied to the microprocessor hardware unit when the unit provides a power-down mode signal.

5. The microprocessor subsystem of claim 4 in which the clock modification logic connected to the clock generation and control logic includes a program controlled register which stores the power-down control signals and has its output connected to the clock generation and control logic.

6. The microprocessor subsystem of either claim 4 or 5 further comprising:

logic which monitors the input received from the clock modification logic and the power-down activity signal supplied by the at least one microprocessor hardware unit and which modifies the clock signals supplied to the microprocessor subsystem in accordance with the input received from the clock modification logic only when the power-down mode activity signal is in a state indicating inactivity.

7. In a microprocessor system having at least one microprocessor subsystem which when inactive supplies a power-down mode activity signal, a method of operating a power management system comprising the steps:

selecting one of a plurality of different power-down clock frequencies;

monitoring the power-down mode activity signal supplied by the at least one microprocessor sub system; and providing normal clock signals to the at least one microprocessor subsystem as long as that system is not providing a power-down mode activity signal but providing the selected power-down clock frequency in place of the normal signal when the power-down mode activity signal is detected.

* * * * *